(12) United States Patent
Laks (10) Patent No.: US 11,532,326 B1
(45) Date of Patent: Dec. 20, 2022

(54) DATA STORAGE DEVICE SELF-SERVO WRITING BY COMPENSATING FOR CORRUPTED SPIRAL TRACK CROSSING SIGNAL

(71) Applicant: Western Digital Technologies, Inc., San Jose, CA (US)

(72) Inventor: Jason H. Laks, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/391,842

(22) Filed: Aug. 2, 2021

(51) Int. Cl.
*G11B 5/596* (2006.01)
*G11B 5/592* (2006.01)

(52) U.S. Cl.
CPC ........ *G11B 5/59661* (2013.01); *G11B 5/5921* (2013.01); *G11B 5/59616* (2013.01)

(58) Field of Classification Search
None
See application file for complete search history.

(56) References Cited

U.S. PATENT DOCUMENTS

| | | | | |
|---|---|---|---|---|
| 7,068,459 B1* | 6/2006 | Cloke | ................ | G11B 5/59661 360/75 |
| 7,088,646 B1* | 8/2006 | Inoue | ................ | G11B 7/08535 |
| 7,391,583 B1 | 6/2008 | Sheh et al. | | |
| 7,499,236 B1 | 3/2009 | Lee et al. | | |
| 7,656,604 B1 | 2/2010 | Liang et al. | | |
| 7,746,592 B1 | 6/2010 | Liang et al. | | |
| 7,898,762 B1 | 3/2011 | Guo et al. | | |
| 8,451,697 B1* | 5/2013 | Rigney | .............. | G11B 5/59633 369/44.29 |
| 8,498,076 B1* | 7/2013 | Sheh | ................... | G11B 5/59666 360/75 |
| 8,634,283 B1 | 1/2014 | Rigney et al. | | |
| 10,074,392 B1* | 9/2018 | Gerasimov | ........ | G11B 5/59661 |
| 2007/0115769 A1* | 5/2007 | Kawase | ............. | G11B 7/08517 |

* cited by examiner

*Primary Examiner* — Jefferson A Evans
(74) *Attorney, Agent, or Firm* — Patterson & Sheridan, LLP; Steven H. VerSteeg

(57) ABSTRACT

A data storage device is disclosed comprising a head actuated over a disk. A spiral track is written on the disk, and a disk locked clock (DLC) is synchronized to the spiral track. The spiral track is read to generate a spiral track crossing signal, and the spiral track crossing signal is processed to generate a position error signal (PES) representing a position of the head over the disk. When the DLC indicates a first part of the spiral track crossing signal is corrupt, the corruption is compensated in order to generate a compensated PES. While servoing the head over the disk based on the PES, a plurality of concentric servo sectors are written on the disk based on the DLC.

20 Claims, 9 Drawing Sheets

DATA STORAGE DEVICE SELF-SERVO WRITING BY COMPENSATING FOR CORRUPTED SPIRAL TRACK CROSSING SIGNAL

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
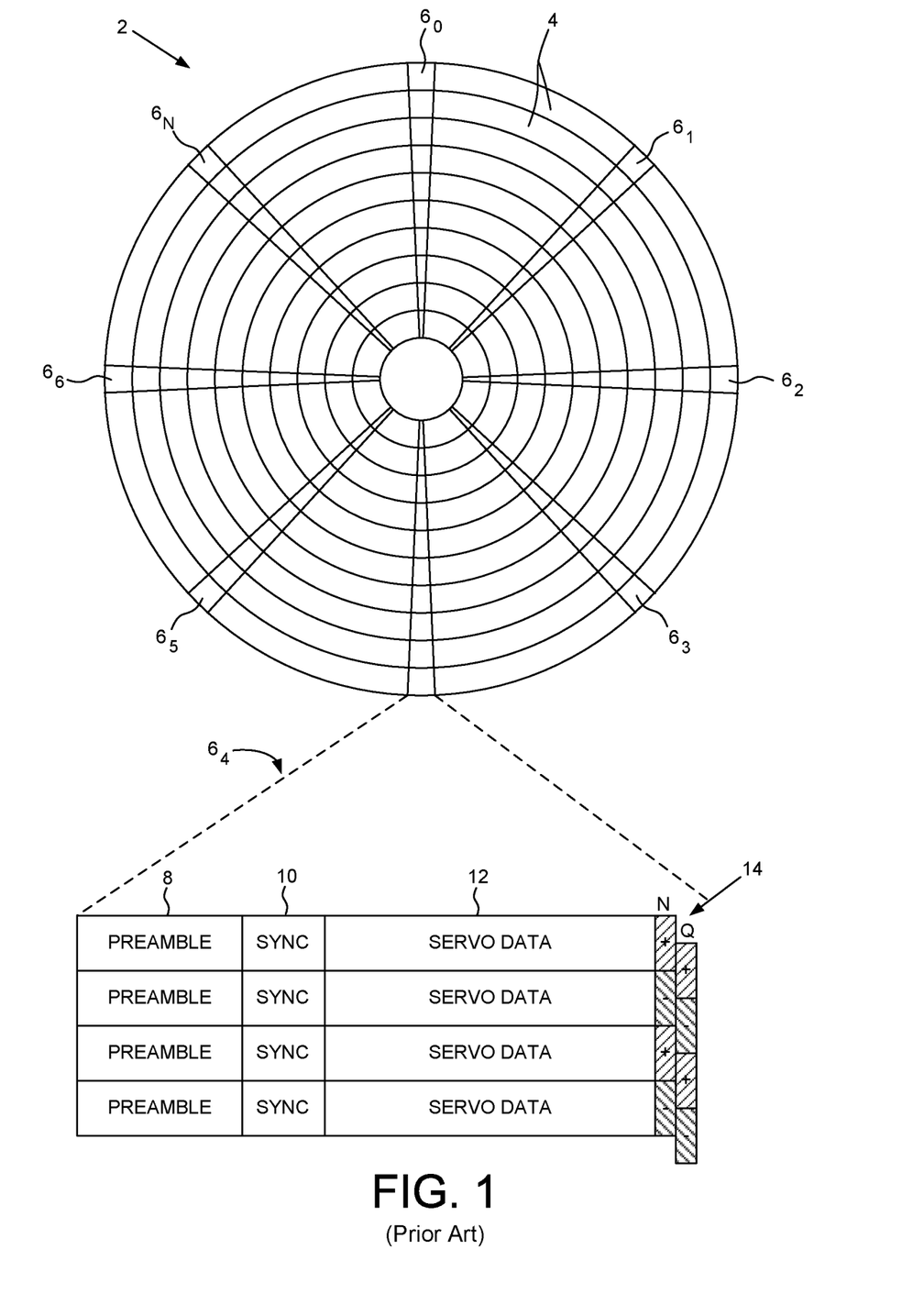
FIG. 1 shows a prior art disk format comprising a plurality of servo tracks defined by servo sectors.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by concentric servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figures 2A, 2B:
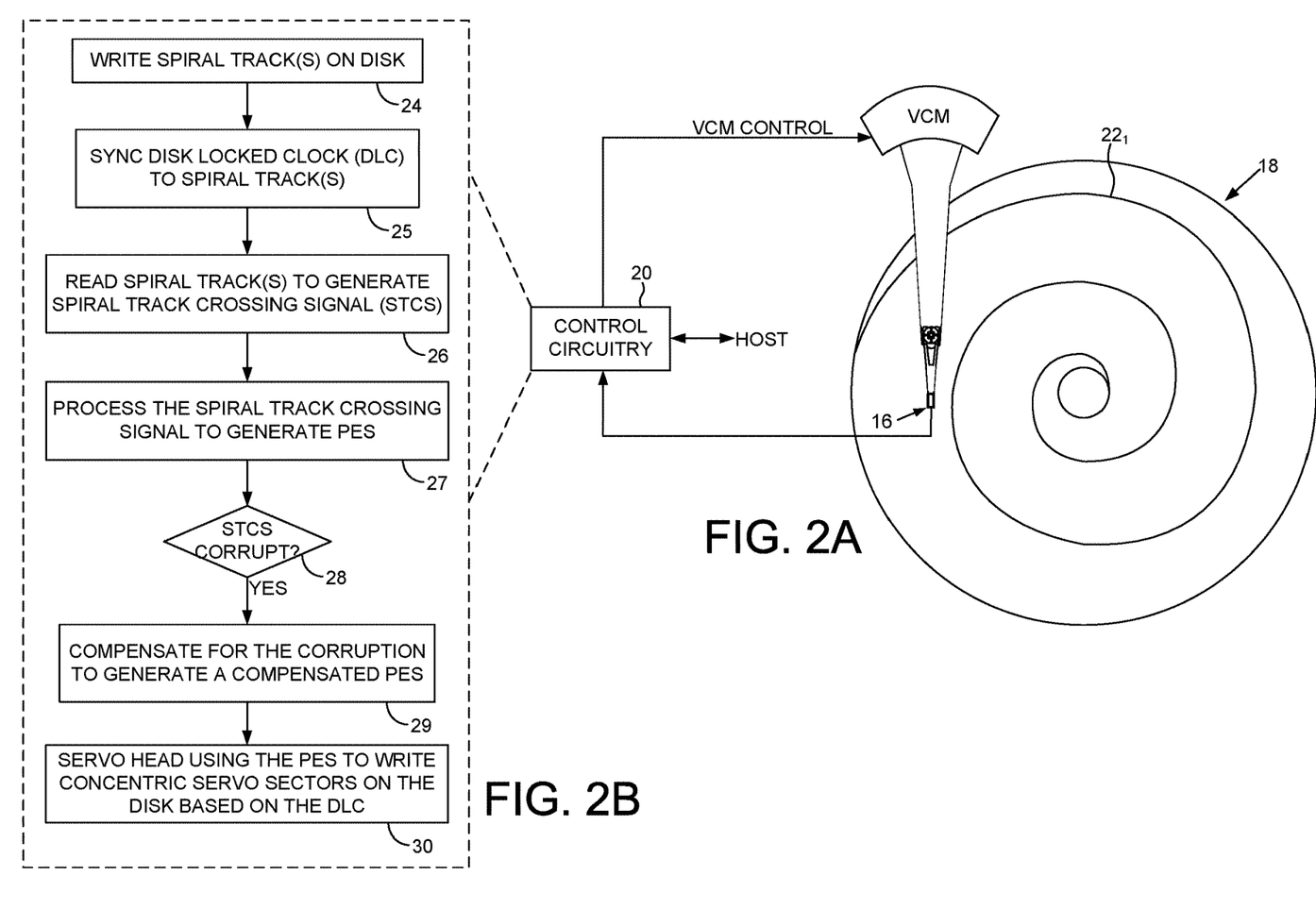
FIG. 2A shows a data storage device in the form of a disk drive according to an embodiment comprising a head actuated over a disk by an actuator arm.
FIG. 2B is a flow diagram according to an embodiment wherein when a spiral track crossing signal is corrupted, the corruption is compensated before generating the PES.

FIG. 2A shows a data storage device in the form of a disk drive according to an embodiment comprising a head 16 actuated over a disk 18, and control circuitry 20 configured to execute the flow diagram of FIG. 2B. At least one spiral track $22_1$ is written on the disk (block 24), and a disk locked clock (DLC) is synchronized to the spiral track (block 25). The spiral track is read to generate a spiral track crossing signal (block 26), and the spiral track crossing signal is processed to generate a position error signal (PES) representing a position of the head over the disk (block 27). When the DLC indicates a first part of the spiral track crossing signal is corrupt (block 28), the corruption is compensated in order to generate a compensated PES (block 29). While servoing the head over the disk based on the PES, a plurality of concentric servo sectors are written on the disk based on the DLC (block 30).

FIG. 2A shows an example of a single spiral track $22_1$ written to the disk 18 while moving the head 16 radially over the disk 18 (e.g., from the outer diameter to the inner diameter). In other embodiments, multiple spiral tracks may be written to the disk 18 each with a different starting rotation angle relative to the circumference of the disk. In this manner the head 16 may cross multiple of the spiral tracks over a revolution of the disk, wherein a PES may be generated at each spiral track crossing for use in servoing the head 16 while servo writing concentric servo sectors to the disk.

Figure 3A:
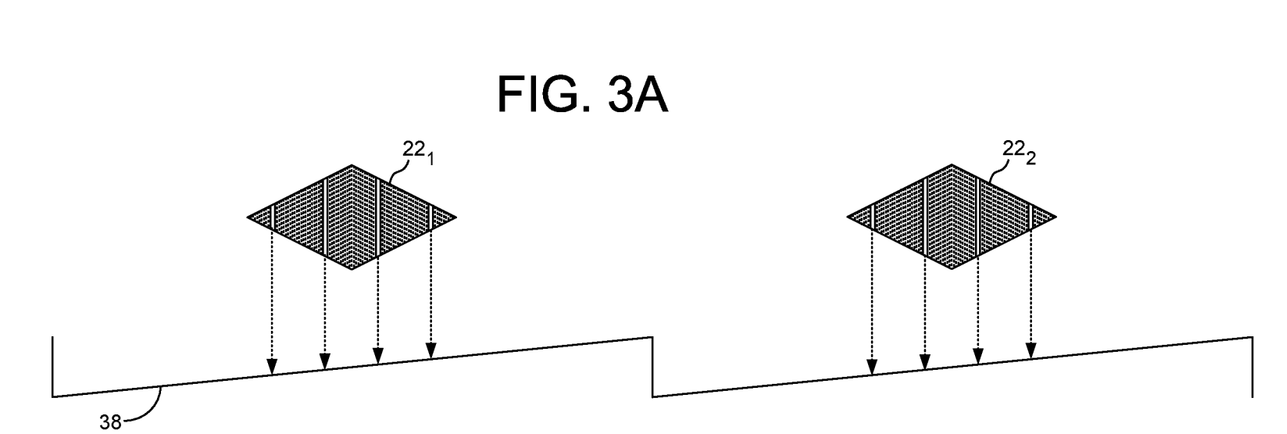
FIG. 3A shows an embodiment wherein a disk locked clock (DLC) is synchronized by clocking a modulo-N counter relative to when sync marks are detected in the spiral tracks.
Figure 3B:
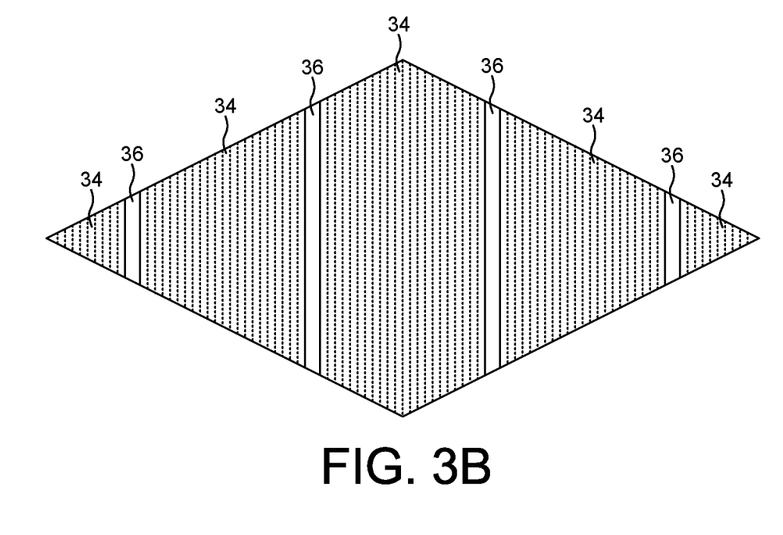
FIG. 3B shows an eye pattern generated when the head cross a spiral track including the sync marks according to an embodiment.

FIG. 3B illustrates an "eye" pattern in the read signal that is generated when the head 16 crosses over spiral track $22_1$. The read signal representing the spiral track crossing comprises high frequency transitions 34 interrupted by sync marks 36 at a predetermined interval. When the head 16 moves in the radial direction, due to the slope of the spiral pattern, the eye pattern will shift in time (left or right) while the sync marks 36 remain fixed (ideally). Hence, motion is detected by noting the arrival time (relative to the DLC) of any convenient feature of the eye pattern. For example, the shift in the eye pattern (detected from the high frequency signal 34) relative to the sync marks 36 may provide the off-track information (spiral position error signal (PES)) for servoing the head 16 over the disk 18.

FIG. 3A shows an embodiment wherein a saw-tooth waveform 38 is generated by clocking a modulo-N counter with the DLC, wherein the frequency of the DLC is adjusted until the sync marks 36 in the spiral tracks are detected at a target modulo-N count value. The DLC may be generated using any suitable circuitry, such as a phase locked loop (PLL) wherein as each sync mark 36 in the spiral tracks is detected, the value of the modulo-N counter represents the phase error for adjusting the PLL. The sync marks 36 in the spiral tracks may comprise any suitable pattern, and in one embodiment, a pattern that is substantially shorter than the sync mark 10 in the conventional concentric servo sectors 6 of FIG. 1.

Figure 4:
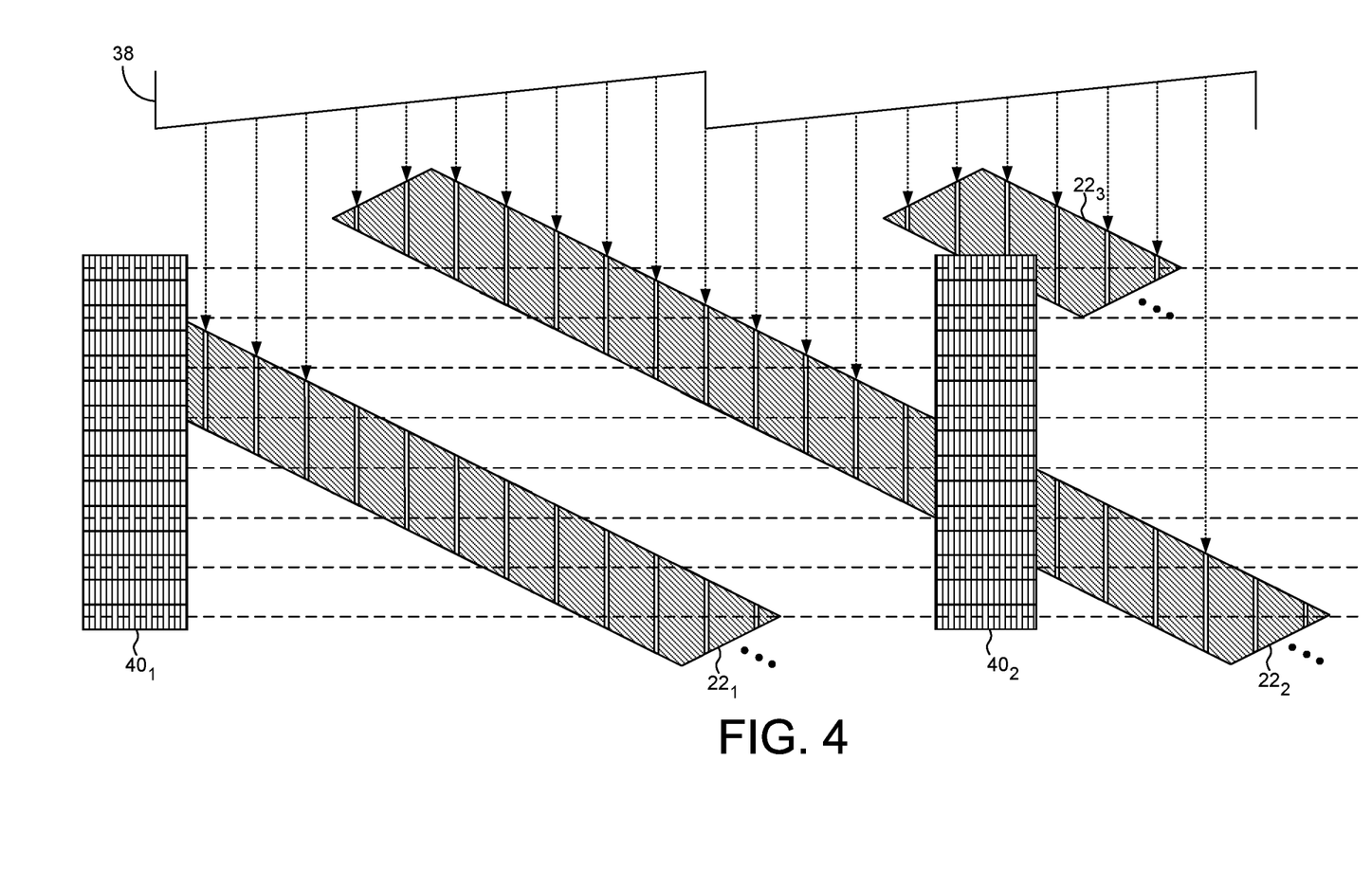
FIG. 4 shows writing of concentric servo sectors using the DLC according to an embodiment.

FIG. 4 illustrates how concentric servo sectors $40_1$-$40_N$ are written to the disk 18 after synchronizing the DLC in response to at least the sync marks 36 in the spiral tracks $22_1$-$22_N$. In the embodiment of FIG. 4, the dashed lines represent the centerlines of the data tracks. In this figure, the spiral slope and sync marks in the spiral tracks $22_1$-$22_N$ are written so that the eye pattern shifts two sync marks 36 (FIG. 3B) when the head moves radially between data tracks. In an alternative embodiment, the slope and sync marks 36 in the spiral tracks $22_1$-$22_N$ are written so that there is any desired shift of the eye pattern due to one data track of movement; that is, the number of sync marks shifted per a data track of movement can be any desired amount including fractional. In the embodiment of FIG. 4, the slope of each spiral track $22_1$-$22_N$ is such that the extent sensed by the read element of the head has a span wider than a concentric data track, however, in an alternative embodiment the span of the spiral intercept can be any desired width relative to the width of a concentric data track.

Figure 5:
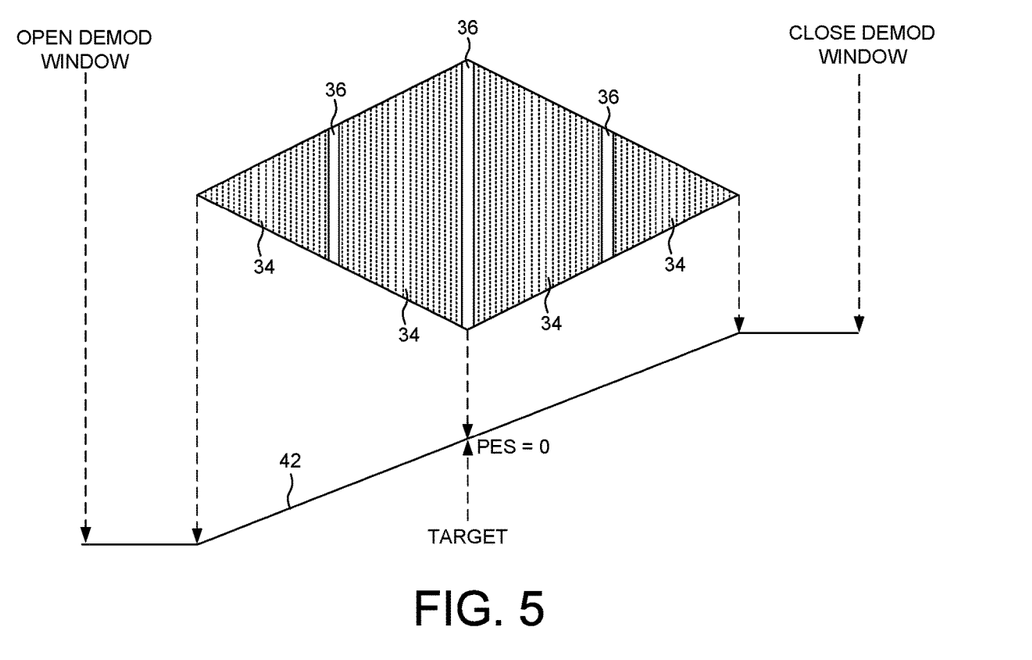
FIG. 5 shows an embodiment wherein the high frequency signal in the spiral tracks is demodulated (e.g., using a single point DFT) and then accumulated over the demodulation window thereby generating a ramp where the mid-point is determined relative to a target sync mark thus generating a PES value.

FIG. 5 shows an embodiment of the present invention wherein the high frequency read signal 34 in a spiral track is demodulated via a single point DFT (sometimes referred to as "integrating") to sense the amplitude of each section of the eye-pattern, and these amplitudes are accumulated to generate a ramp signal 42. The PES is generated relative to a target sync mark 36 in the spiral track and a reference point of the ramp signal 42. In other embodiments, the PES may be generated by detecting a change in arrival time (based on the DLC) of any suitable feature in the demodulated/accumulated waveform, such as the time at which the ramp signal 42 achieves a target fraction of the total amplitude. In the embodiment of FIG. 5, there are three sync marks in each spiral track crossing (each eye pattern) and the PES is generated as the deviation of the middle sync mark from the center of the ramp signal 42. This deviation can be computed as the difference in the amplitude of the ramp signal 42 when the middle sync mark is detected, or the difference in time between when the middle sync mark is detected and the middle of the ramp signal 42. Also in this embodiment, the demodulation window is opened a number of sync mark intervals preceding the expected spiral track crossing (one sync mark interval in this example) and closed a number of sync mark intervals after the expected spiral track crossing (one sync mark interval in this example). In one embodiment, the ramp signal 42 is generated by integrating the high frequency signal 34 (e.g., by accumulating the DFT magnitude) between the sync marks 36 without resetting the accumulation; that is, (DFT) integration windows within the demodulation window are generated corresponding to the segments of high frequency signal 34 between each sync mark 36 (as determined from the DLC).

Figure 6:
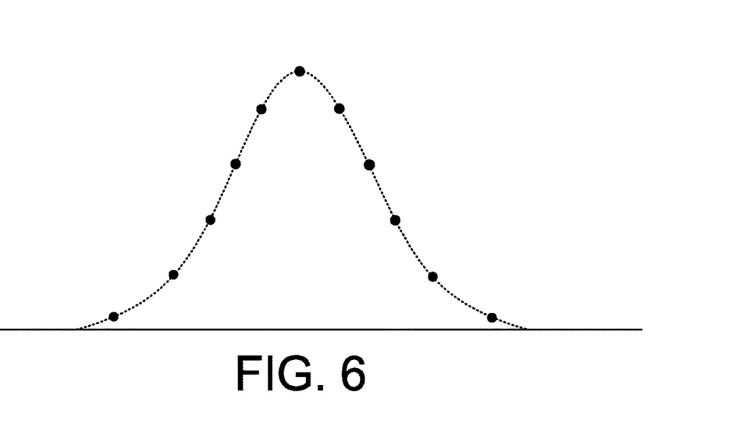
FIG. 6 shows a nominal sampled pulse signal representing an uncorrupted spiral track crossing signal according to an embodiment.

The PES when reading a spiral track may be generated in any suitable manner other than generating a ramp signal as shown in FIG. 5. For example in one embodiment, a spiral track crossing signal may be generated by integrating (DFT) the high frequency signal 34 between consecutive sync marks 36 and resetting the integrator at the beginning of each sync mark interval with the result being a sampled pulse signal such as shown in FIG. 6. In one embodiment, the PES is generated by correlating the sampled pulse signal generated when reading a spiral track with a nominal, time-shifted pulse signal representing a nominal spiral track crossing. Further details of this embodiment are disclosed in U.S. Pat. No. 7,656,604 entitled "DISK DRIVE DEMODULATING A SPIRAL TRACK BY FINDING A MAXIMUM CORRELATION BETWEEN A SPIRAL TRACK CROSSING SIGNAL AND A TIME-SHIFTED NOMINAL SPIRAL TRACK CROSSING SIGNAL," the disclosure of which is incorporated herein by reference.

Figure 7A:
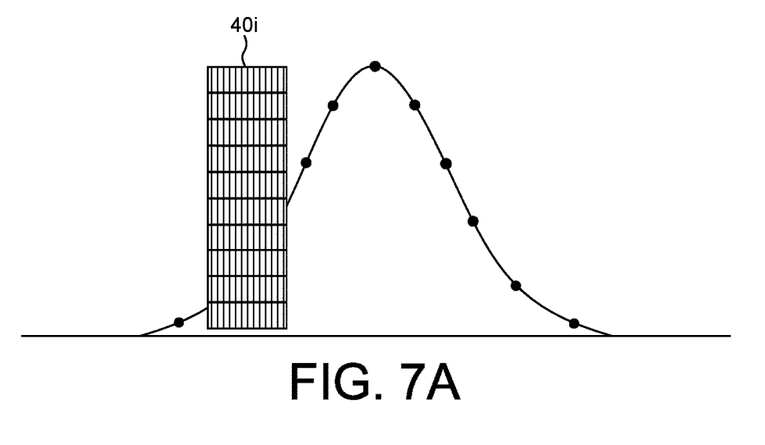
FIG. 7A shows an embodiment wherein the spiral track crossing signal is corrupted when the spiral track is overwritten by a concentric servo sector.

The spiral track crossing signal (e.g., as represented by the sampled pulse signal shown in FIG. 6) may be corrupted due to a number of different conditions. FIG. 7A shows an example wherein the sampled pulse signal generated from reading a spiral track may be corrupted due to one or more concentric servo sectors 40i overwriting the spiral track. When this happens, the resulting distortion of the sampled pulse signal induces an error in the PES generated for the spiral track crossing. Further, in one embodiment the distortion in the pulse signal may be non-deterministic due to the varying content of the concentric servo sectors, and therefore the error induced in the PES may also be non-deterministic. In one embodiment shown in FIG. 7B, when the DLC indicates a spiral track crossing signal has been corrupted, the corrupted part of the track crossing signal (pulse signal in this example) is "blanked" by replacing the random signal with a known signal (e.g., all zeros). In this manner the distortion in the spiral track crossing signal becomes deterministic as does the error induced in the PES. Accordingly, when the PES is generated based on the compensated (blanked) spiral track crossing signal, the compensated PES may be adjusted using a calibrated error value as described below with reference to the flow diagram of FIG. 9A.

In another embodiment, the spiral track crossing signal may be corrupted due to crosstalk when writing a concentric servo sector concurrent with reading a spiral track. For example, in one embodiment at certain radial locations of the head over the disk the read element of the head may be leading the write element of the head such that the read element may be reading a "clean" spiral track, but the crosstalk of concurrently writing a concentric servo sector corrupts the read signal resulting in a corrupted spiral track crossing signal.

Figure 7B:
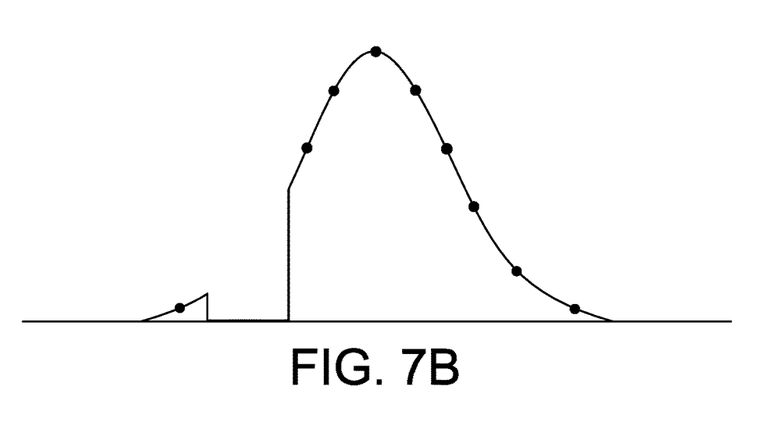
FIG. 7B shows an embodiment wherein the corrupted part of the spiral track crossing signal is "blanked" in order to compensate for the corruption.
Figure 7C:
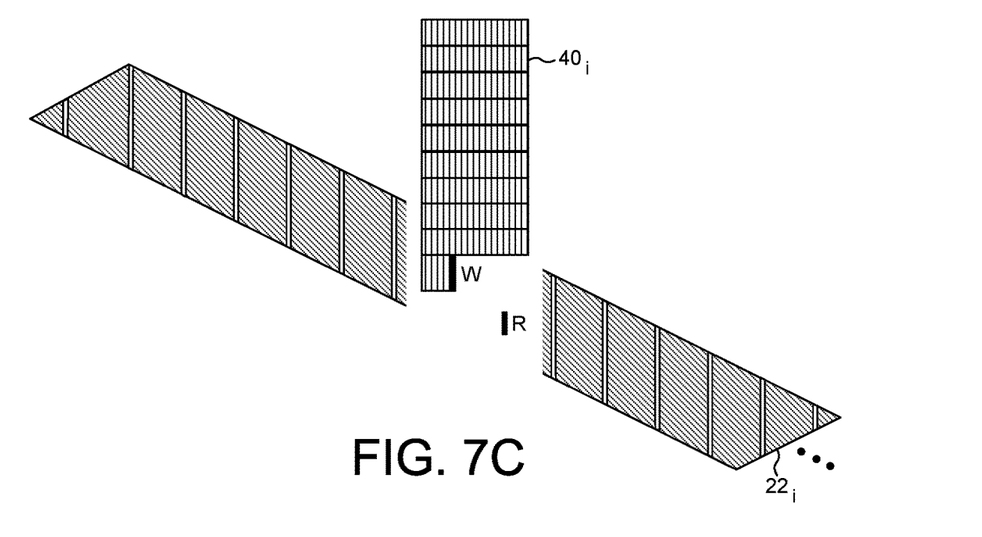
FIG. 7C shows an embodiment wherein the concentric servo sectors are written within a gap of the spiral track in order to prevent the residual spiral track from interfering with the concentric servo sectors during normal operation of the disk drive.

FIG. 7C shows an embodiment wherein the concentric servo sectors 40i are written within a gap of the spiral track 22i in order to prevent the residual spiral track from interfering with the concentric servo sectors 40i during normal operation of the disk drive. As shown in FIG. 7C, in one embodiment the spiral track crossing signal may be corrupted due to the read element (R) of the head reading the gap prior to the write element (W) writing at least part of the next concentric servo sector. Once the write element (W) begins writing at least part of the next servo sector, the crosstalk of the write may also corrupt the spiral track crossing signal even as the read element (R) begins reading the spiral track 22*i* after the gap.

Figure 8A:
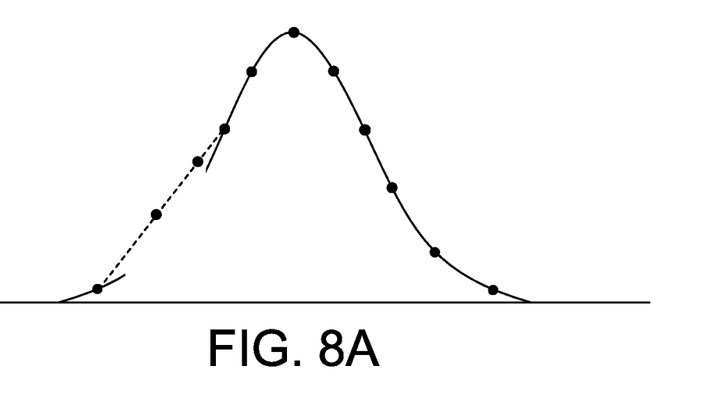
FIGS. 8A-8C show an embodiment wherein a corrupted spiral track crossing signal is compensated by interpolating the spiral track crossing signal.
Figure 8B:
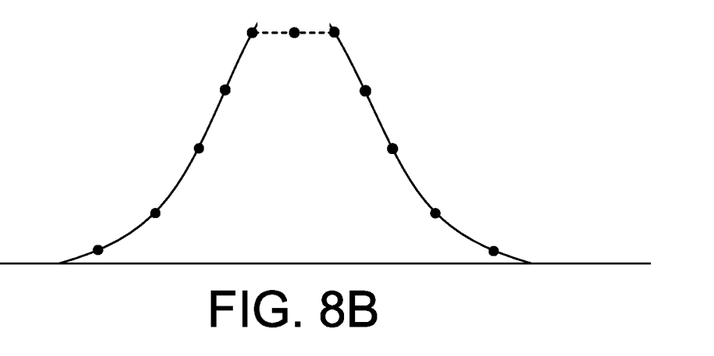
Figure 8C:
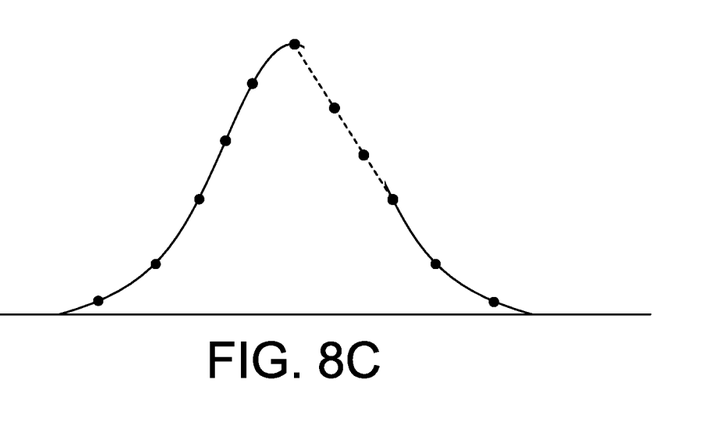

When the spiral track crossing signal is corrupted (e.g., due to a concentric servo sector overwriting a spiral track, crosstalk of a write signal when writing a concentric servo sector, reading a gap within a spiral track, etc.), the corrupted spiral track crossing signal may be compensated in any suitable manner (i.e., other than the "blanking" embodiment shown in FIG. 7B). FIGS. 8A-8C show an embodiment wherein a corrupted spiral track crossing signal may be compensated by interpolating the pulse signal samples through the part of the signal that is corrupted. That is instead of simply blanking the corrupted part of the spiral track crossing signal as in FIG. 7B, the corrupted part is estimated using interpolation such as shown in FIG. 8A. In the embodiment shown in FIGS. 8A-8C, the corrupted part of the spiral track crossing signal is estimated using linear interpolation; however, other embodiments may use more sophisticated interpolation techniques, such as curve fitting the signal samples to a suitable function (e.g., a Gaussian function). In yet another embodiment, the corrupted part of the spiral track crossing signal may be estimated by replacing the corrupted part with a corresponding uncorrupted, symmetric part of the spiral track crossing signal (e.g., replacing the corrupted left part of the pulse signal in FIG. 8A with a corresponding right side of the pulse signal). The PES for servoing the head may then be generated based on the compensated spiral track crossing signal, such as by generating a ramp signal as shown in FIG. 5 or correlating the compensated spiral track crossing signal with a nominal, time-shifted spiral track crossing signal as described above.

Figure 9A:
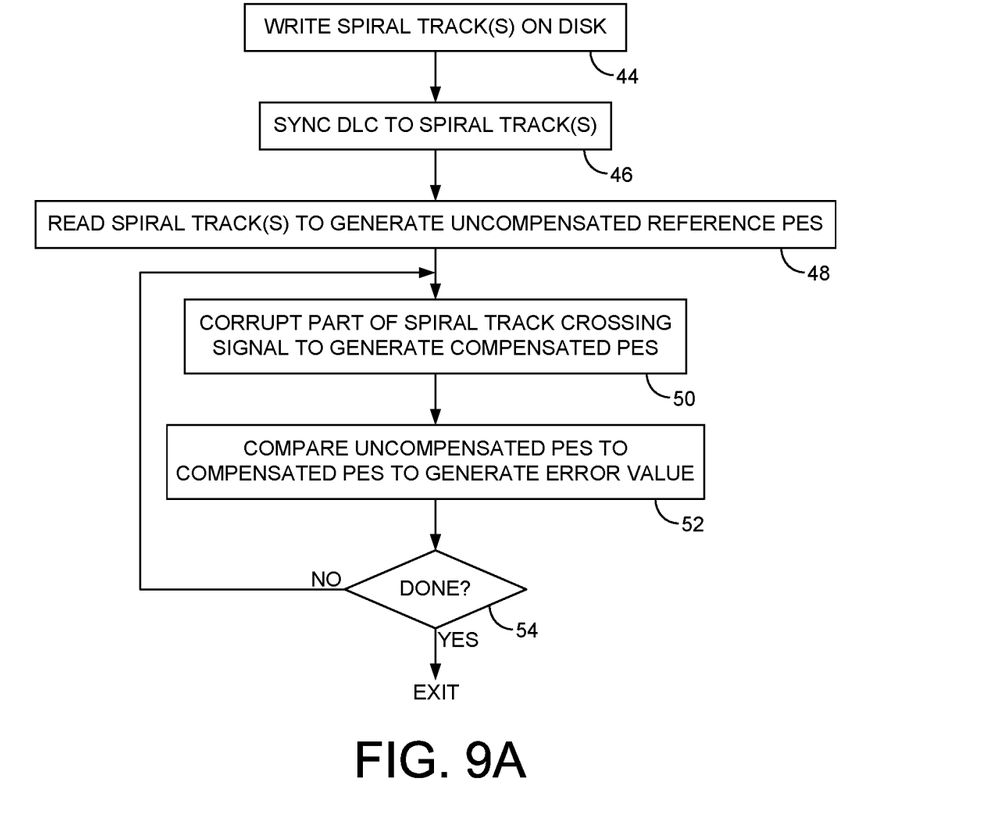
FIG. 9A is a flow diagram according to an embodiment wherein an error induced in the PES due to compensating for a corrupted spiral track crossing signal is calibrated.
Figure 9B:
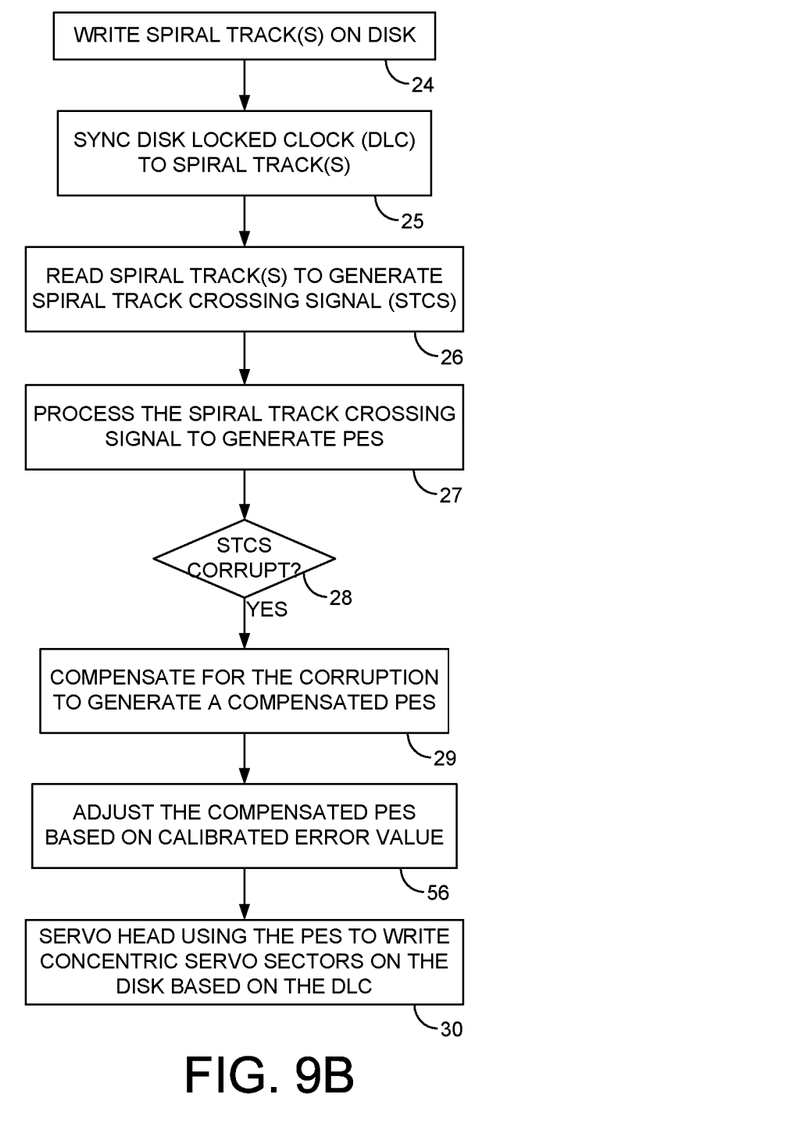
FIG. 9B is a flow diagram according to an embodiment wherein the error induced in the PES due to compensating for a corrupted spiral track crossing signal is used to adjust the compensated PES.

In one embodiment, when compensating for a corrupted spiral track crossing signal the effect of the compensation is deterministic, such as when the corrupted part of the signal is blanked as shown in FIG. 7B or interpolated as shown in FIGS. 8A-8C. Accordingly in one embodiment, the error induced into the PES due to compensating for a corrupted spiral track crossing signal may be calibrated and substantially cancelled from the PES. FIG. 9A is a flow diagram according to this embodiment wherein one or more clean spiral tracks may be written to the disk (block 44). After synchronizing the DLC to the spiral tracks (block 46), the spiral tracks may be read to generate clean spiral track crossing signals such as shown in FIG. 6 from which an uncompensated reference PES may be generated (block 48). In one embodiment, an uncompensated PES may be generated for a number of spiral track crossings and the multiple PES values averaged to obtain the uncompensated reference PES. Also in one embodiment, the spiral track crossing signals may be averaged to generate a nominal spiral track crossing signal. After generating the uncompensated reference PES, sections of the nominal spiral track crossing signal are corrupted to simulate, for example, corruption due to a concentric servo sector overwriting a spiral track, crosstalk of a write signal when writing a concentric servo sector, reading a gap within a spiral track, etc., and the corruption is compensated through blanking, interpolation, etc., as described above. The compensated spiral track crossing signal is then processed to generate a corresponding compensated PES (block 50). The uncompensated reference PES is compared to the compensated PES in order to calibrate an error value (block 52). In one embodiment, at block 54 the flow diagram of FIG. 9A is repeated from block 50 to simulate all possible locations where different parts of a spiral track crossing signal can be corrupted such as shown in FIGS. 8A-8C in order to generate a corresponding calibrated error value. FIG. 9B is a flow diagram which extends on the flow diagram of FIG. 2B, wherein after generating the compensated PES based on a compensated spiral track crossing signal (block 29), the compensated PES is adjusted (block 56) using the corresponding error value calibrated at block 52 of FIG. 9A, thereby substantially cancelling the error induced into the PES due to compensating for a corrupted spiral track crossing signal.

In one embodiment, the fidelity of the spiral track crossing signal and corresponding PES increases as the slope of each spiral track decreases (i.e. as the eye pattern shown in FIG. 3B becomes wider). That is, writing the spiral tracks with a slower radial velocity as the disk rotates so as to decrease the slope results in a wider spiral track crossing signal which improves the fidelity when generating the PES. However, decreasing the slope of the spiral tracks also increases the frequency at which the spiral track crossing signal may be corrupted as described above which, if not compensated, reduces the overall fidelity of the PES generated around the circumference of the disk. By correctly compensating the corrupted spiral track crossing signals as described above, the slope of the spiral tracks may be decreased so that the overall fidelity of the PES improves around the circumference of the disk. In addition, when the slope of the spiral tracks decreases resulting in a wider spiral track crossing signal, the efficacy of the above described compensation improves due to the corruption (e.g., overwrite) affecting a relatively smaller fraction of the total spiral track crossing signal.

In one embodiment, the target times and spans of the concentric servo sectors, as well as the target slope of the spiral tracks, can be entered as channel parameters and the channel can automatically compensate the spiral track crossing signals as described above.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and sub-combinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head actuated over the disk; and
   control circuitry configured to:
   write a spiral track on the disk;
   synchronize a disk locked clock (DLC) to the spiral track;
   read the spiral track to generate a spiral track crossing signal;
   process the spiral track crossing signal to generate a position error signal (PES) representing a position of the head over the disk;
   when the DLC indicates a first part of the spiral track crossing signal is corrupt, compensate for the corruption in order to generate a compensated PES; and
   while servoing the head over the disk based on the PES, write a plurality of concentric servo sectors on the disk based on the DLC.

2. The data storage device as recited in claim 1, wherein the control circuitry is further configured to compensate for the corruption by interpolating the spiral track crossing signal.

3. The data storage device as recited in claim 2, wherein the control circuitry is further configured to interpolate the spiral track crossing signal using a linear interpolation.

4. The data storage device as recited in claim 2, wherein the control circuitry is further configured to interpolate the spiral track crossing signal by curve fitting the spiral track crossing signal based on a function representing a nominal spiral track crossing signal.

5. The data storage device as recited in claim 2, wherein the control circuitry is further configured to interpolate the spiral track crossing signal by replacing the first part of the spiral track crossing signal with a corresponding second part of the spiral track crossing signal.

6. The data storage device as recited in claim 1, wherein the control circuitry is further configured to compensate for the corruption by blanking the first part of the spiral track crossing signal.

7. The data storage device as recited in claim 1, wherein the control circuitry is further configured to adjust the compensated PES based on a calibrated error caused by compensating the corrupted spiral track crossing signal.

8. The data storage device as recited in claim 7, wherein the control circuitry is further configured to calibrate the error by comparing a first PES generated based on a full spiral track crossing signal to a second PES generated based on a partial spiral track crossing signal.

9. The data storage device as recited in claim 8, wherein the partial spiral track crossing signal corresponds to the spiral track crossing signal that is corrupt as indicated by the DLC.

10. A data storage device comprising:
    a disk;
    a head actuated over the disk; and
    control circuitry configured to:
    write a spiral track on the disk;
    read the spiral track to generate a spiral track crossing signal;
    process the spiral track crossing signal to generate a position error signal (PES) representing a position of the head over the disk;
    while servoing the head over the disk based on the PES, write a plurality of concentric servo sectors on the disk;
    when a first part of the spiral track crossing signal has been corrupted, compensate for the corruption in order to generate a compensated PES; and
    adjust the compensated PES based on a calibrated error caused by compensating for the corruption.

11. The data storage device as recited in claim 10, wherein the first part of the spiral track crossing signal is corrupted due to a concentric servo sector overwriting the spiral track.

12. The data storage device as recited in claim 10, wherein the control circuitry is further configured to compensate for the corruption by interpolating the spiral track crossing signal.

13. The data storage device as recited in claim 12, wherein the control circuitry is further configured to interpolate the spiral track crossing signal using a linear interpolation.

14. The data storage device as recited in claim 12, wherein the control circuitry is further configured to interpolate the spiral track crossing signal by curve fitting the spiral track crossing signal based on a function representing a nominal spiral track crossing signal.

15. The data storage device as recited in claim 12, wherein the control circuitry is further configured to interpolate the spiral track crossing signal by replacing the first part of the spiral track crossing signal with a corresponding second part of the spiral track crossing signal.

16. The data storage device as recited in claim 10, wherein the control circuitry is further configured to compensate for the corruption by blanking the first part of the spiral track crossing signal.

17. The data storage device as recited in claim 10, wherein the control circuitry is further configured to calibrate the error by comparing a first PES generated based on a full spiral track crossing signal to a second PES generated based on a partial spiral track crossing signal.

18. The data storage device as recited in claim 17, wherein the partial spiral track crossing signal corresponds to the spiral track crossing signal that is corrupt.

19. A data storage device comprising:
- a disk;
- a head actuated over the disk; and
- a means for writing a spiral track on the disk;
- a means for synchronizing a disk locked clock (DLC) to the spiral track;
- a means for reading the spiral track to generate a spiral track crossing signal;
- a means for processing the spiral track crossing signal to generate a position error signal (PES) representing a position of the head over the disk;
- when the DLC indicates a first part of the spiral track crossing signal is corrupt, a means for compensating for the corruption in order to generate a compensated PES; and
- while servoing the head over the disk based on the PES, a means for writing a plurality of concentric servo sectors on the disk based on the DLC.

20. The data storage device as recited in claim 19, wherein the means for compensating for the corruption comprises a means for interpolating the spiral track crossing signal.

* * * * *